(12) United States Patent
Terada et al.

(10) Patent No.: US 7,517,015 B2
(45) Date of Patent: Apr. 14, 2009

(54) HEADREST DEVICE

(75) Inventors: Takami Terada, Toyota (JP); Yukifumi Yamada, Toyota (JP); Takuya Mizuno, Nagoya (JP); Hiromi Taniguchi, Kariya (JP); Masatoshi Mori, Anjo (JP); Kiyoka Matsubayashi, Aichi-gun (JP); Fumitoshi Akaike, Nisshin (JP); Seiya Nishimura, Okazaki (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP); Toyota Boshoku Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/545,583

(22) Filed: Oct. 11, 2006

(65) Prior Publication Data

US 2007/0085400 A1    Apr. 19, 2007

(30) Foreign Application Priority Data

Oct. 17, 2005    (JP) .............................. 2005-302194

(51) Int. Cl.
*A47C 7/38* (2006.01)
(52) U.S. Cl. ............................................. 297/216.12
(58) Field of Classification Search ................ 297/391, 297/216.12, 408
See application file for complete search history.

(56) References Cited

U.S. PATENT DOCUMENTS 4,762,367 A * 8/1988 Denton ....................... 297/409
5,020,855 A * 6/1991 Lindberg et al. ............ 297/391
6,082,817 A * 7/2000 Muller ................... 297/216.12
6,623,073 B2 * 9/2003 Schafer et al. ......... 297/216.12

(Continued)

FOREIGN PATENT DOCUMENTS

JP        8-187139 A       7/1996

(Continued)

OTHER PUBLICATIONS

Japanese Official Action issued on Dec. 24, 2008 in Japanese counterpart application, and partial English language translation of Official Action.

*Primary Examiner*—David Dunn
*Assistant Examiner*—James Alex
(74) *Attorney, Agent, or Firm*—Buchanan Ingersoll & Rooney PC

(57) ABSTRACT

A headrest device includes a fixed base, a movable base disposed forward relative to the fixed base, at least one first link being rotatably supported by a connecting shaft provided between the movable base and the fixed base, at least one second link being supported by the connecting shaft so as to rotate relative to the first link, a connection portion connecting the movable base and the fixed base to be relatively movable by a relative rotation between the first link and the second link, a drive portion relatively rotating the first link and the second link in a direction so as to deploy the movable base away from the fixed base on the basis of a detected result by a rear-end collision detection means, and at least one relative rotation restricting portion provided for restricting a relative rotation between the first link and the second link about the connecting shaft.

16 Claims, 8 Drawing Sheets

U.S. PATENT DOCUMENTS

| | | | |
|---|---|---|---|
| 7,070,235 B2 * | 7/2006 | Schilling et al. | 297/216.12 |
| 7,073,856 B2 * | 7/2006 | Akaike et al. | 297/216.12 |
| 7,284,793 B2 * | 10/2007 | Kluhspies et al. | 297/216.12 |
| 2004/0262974 A1 | 12/2004 | Terada et al. | |
| 2005/0280304 A1 * | 12/2005 | Akaike et al. | 297/391 |
| 2006/0071518 A1 * | 4/2006 | Hippel et al. | 297/216.12 |
| 2006/0226688 A1 * | 10/2006 | Terada et al. | 297/391 |
| 2006/0279114 A1 * | 12/2006 | Toda et al. | 297/216.12 |
| 2007/0246989 A1 * | 10/2007 | Brockman | 297/391 |
| 2007/0257528 A1 * | 11/2007 | Akaike et al. | 297/216.12 |

FOREIGN PATENT DOCUMENTS

| | | |
|---|---|---|
| JP | 11-334439 A | 12/1999 |
| JP | 2005-13604 A | 1/2005 |
| JP | 2005-087650 A | 4/2005 |
| JP | 2005-177227 A | 7/2005 |

* cited by examiner

FIG. 9
FIG. 10
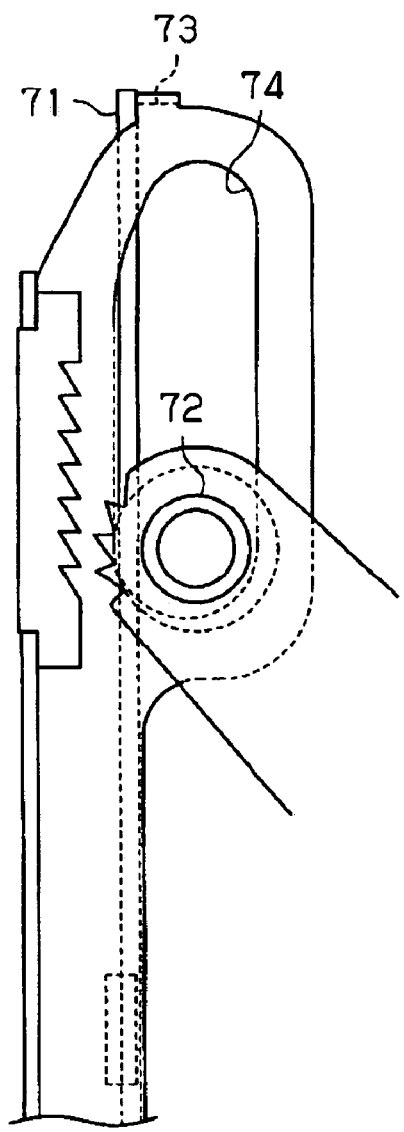
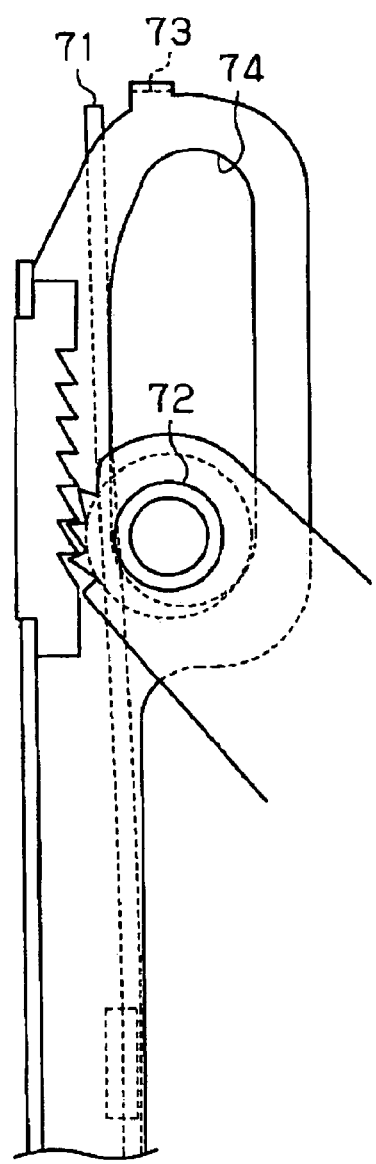

HEADREST DEVICE

CROSS REFERENCE TO RELATED APPLICATIONS

This application is based on and claims priority under 35 U.S.C. §119 with respect to Japanese Patent Application No. 2005-302194 filed on Oct. 17, 2005, the entire content of which is incorporated herein by reference.

FIELD OF THE INVENTION

The present invention relates to a headrest device.

BACKGROUND

A headrest device is mounted on a vehicle, which a headrest device mitigates an impact applied to a cervix by restricting a backward movement of a head of an occupant after moving forward when the vehicle is rear-ended or when that the vehicle is to be rear-ended is predicted.

For example, a headrest device described in JPH11-334439A (FIG. 2) includes a drive motor provided in a headrest, a worm fixed to a rotational shaft of the drive motor, and a gear that is engaged with the worm. The drive motor is activated by signals transmitted from a sensor which is mounted on a vehicle to predict or detect rear-end collision. With this headrest device, when the collision is either predicted or detected, the headrest is tiled forward by activating the drive motor to protect a head of an occupant and to prevent the occupant from causing hyperextension-hyperflexion injury when the vehicle is rear-ended. Further, with a headrest device described in JPH08-187139A, a stepping motor and a gear mechanism vibrates stays which support a headrest and an attitude of the headrest is fixed when the vehicle is rear-ended, in order to prevent the occupant form causing hyperextension-hyperflexion injury.

Considerable load is applied to the rotational shaft of the motor and the gear when a head of an occupant impacts on the headrest upon the rear-end collision. This considerable load can rotate the motor in reverse, which leads to a risk that the load applied at the rear-end collision cannot be supported, that is, the head of the occupant cannot be supported. In addition, using a larger size motor which outputs a torque having a degree which can resist the load, that is, the motor does not rotate in reverse by the load applied at the rear-end collision, hinders downsizing and lightening the weight of the headrest device.

A need thus exists for a headrest device, which securely supports a head of an occupant, prevents a load by an impact of the head against a headrest from being applied to a drive portion of the headrest, and downsizes and reduces the weight thereof.

SUMMARY OF THE INVENTION

In light of the foregoing, the present invention provides a headrest device, which includes a fixed base being supported by a seatback, a movable base disposed at a forward position relative to the fixed base, at least one first link being rotatably supported by a connecting shaft provided between the movable base and the fixed base, the first link having a first end connected to the movable base and a second end connected to the fixed base, at least one second link being supported by the connecting shaft so as to rotate relative to the first link, the second link having a first end connected to the movable base and a second end connected to the fixed base, a connection portion including the first link and the second link and connecting the movable base and the fixed base to be relatively movable by a relative rotation between the first link and the second link, a drive portion relatively rotating the first link and the second link in a direction so as to deploy the movable base away from the fixed base on the basis of a detected result by a rear-end collision detection means which is connected to the connection portion to detect and/or predict a rear-end collision of a vehicle, and at least one relative rotation restricting portion provided for restricting a relative rotation between the first link and the second link about the connecting shaft in accordance with a degree of a load applied to the movable base.

BRIEF DESCRIPTION OF THE DRAWINGS

The foregoing and additional features and characteristics of the present invention will become more apparent from the following detailed description considered with reference to the accompanying drawings, wherein:

FIG. 9 is a partial enlarged view according to a modified example of the present invention.

FIG. 10 is a partial enlarged view according to the modified example of the present invention.

DETAILED DESCRIPTION

One embodiment of the present invention will be explained with reference to illustrations of drawing figures as follows.

Figure 1:
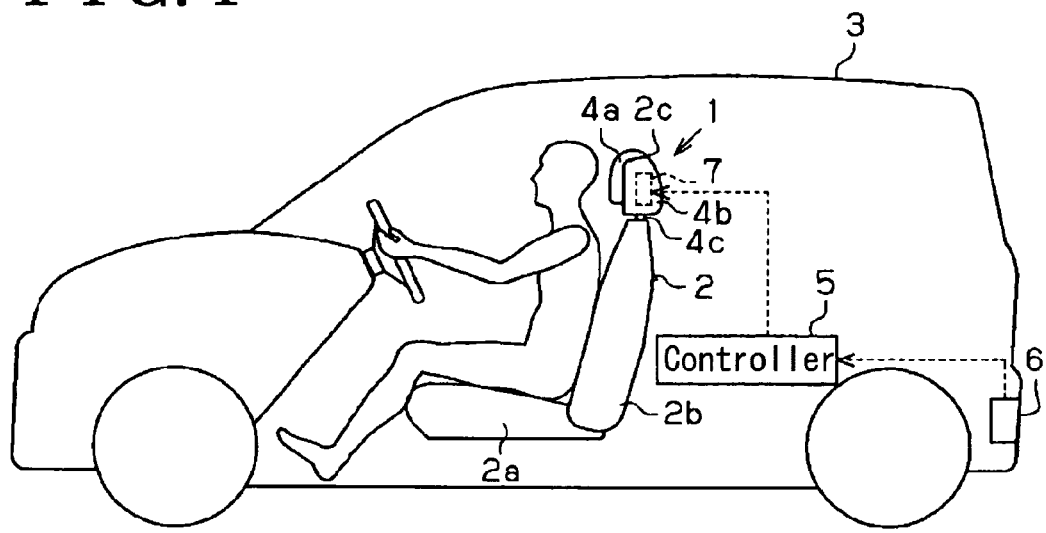
FIG. 1 is a lateral view of a vehicle provided with a seat for a vehicle having a headrest device according to an embodiment of the present invention.
Figure 2:
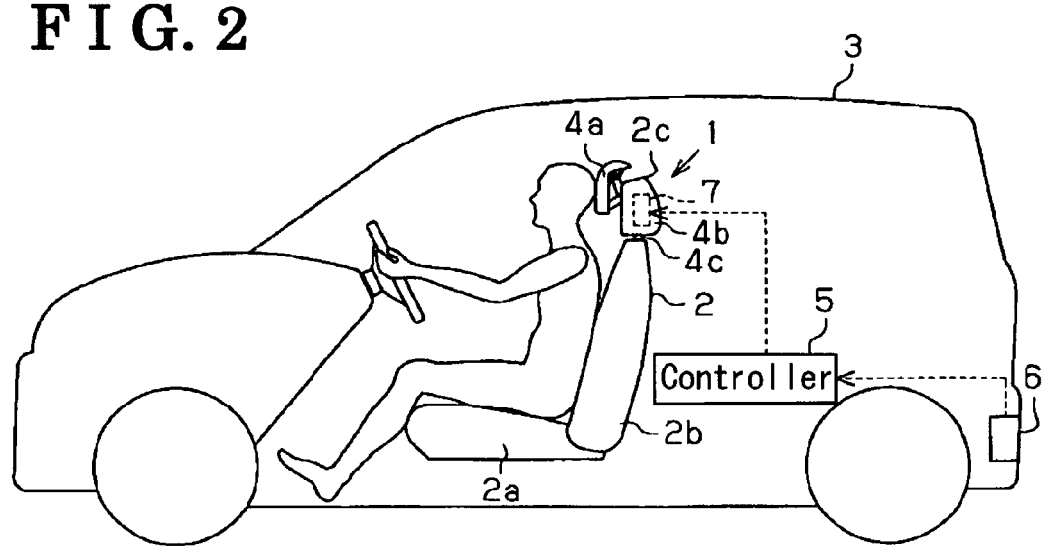
FIG. 2 is a lateral view of the vehicle provided with the seat for the vehicle having the headrest device according to the embodiment of the present invention.

As shown in FIGS. 1-2, a vehicle 3 is provided with a seat 2 for a vehicle. The seat 2 for the vehicle includes a seat cushion 2a maintained in a vehicle compartment, a seatback 2b supported at a rear end of the seat cushion 2a so as to rotate in a longitudinal direction of the vehicle (i.e., right-left direction in FIG. 1), and a headrest 2c supported by the seatback 2b. The headrest 2c includes a headrest device 1 which forms a part of a frame of the headrest 2c. The headrest 1 is housed in a space formed between a front cover 4a which forms a front side of the headrest 2c and a rear cover 4b which forms a rear side of the headrest 2c, and is supported by a headrest stay 4c provided at a top end portion of the seatback 2b to be positioned at a top part of the seat back 2b.

The headrest device 1 is connected to a controller 5, and a detection signal is inputted from a sensor 6 serving as a rear-end collision detecting means which predicts or detects rear-ending to a vehicle. The controller 5 moves the front cover 4a in a front-back direction of an occupant seated on the seat 2, that is a longitudinal direction of the vehicle, relative to the rear cover 4b according to the embodiment of the present invention. Upon predicting or detecting a collision of the vehicle on the basis of the detection signal, the controller 5 moves the front cover 4 from a normal position (i.e., a retracted position shown in FIG. 1), where the front cover 4a is positioned relatively close to the rear cover 4b, to a supporting position (i.e., a forward position or deployed position shown in FIG. 2), where the front cover 4a is deployed away from the rear cover 4b and positioned forward relative to the normal position. The controller 5 and the sensor 6 may be integrally constructed with the headrest device 1.

Figure 3:
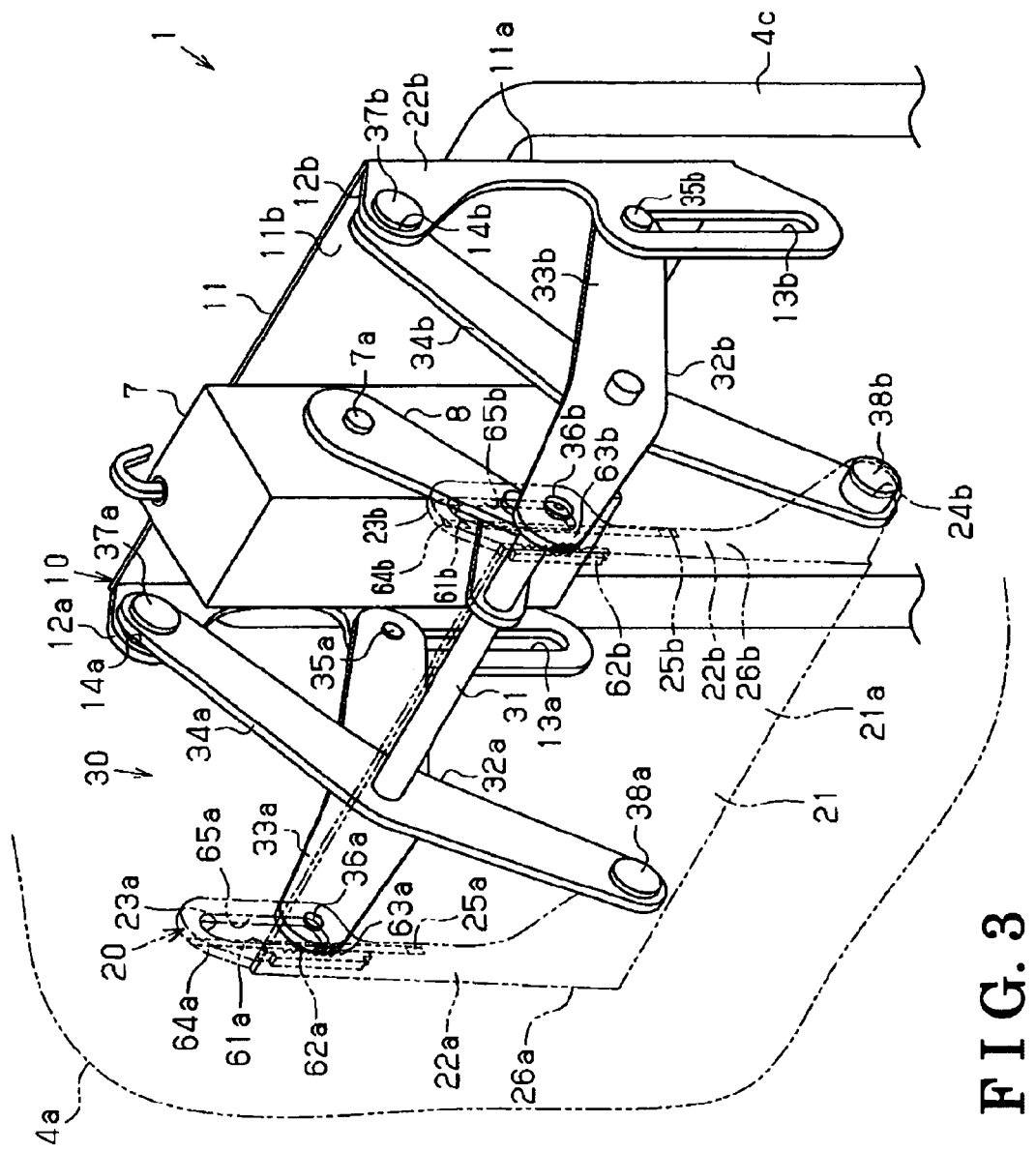
FIG. 3 is a perspective view of a headrest device according to the embodiment of the present invention.

A construction of the headrest device 1 will be explained as follows. As shown in FIG. 3, the headrest device 1 includes a fixed base 10 and a movable base 20 which are arranged in parallel to each other, and a connecting portion 30 which connects the fixed base 10 and the movable base 20. The movable base 20 is positioned forward relative to the fixed base 10. The headrest device 1 includes a drive portion 7 connected to the controller 5 (shown in FIG. 1). The drive portion 7 includes a motor 7A which is configured to rotate in a positive and reverse direction and a reduction gear which reduces a rotation speed of the motor 7A. The drive portion 7 reduces the rotation speed of the motor 7A by the reduction gear to rotate an output shaft 7a in a positive and reverse direction.

The fixed base 10 is disposed rearward relative to the movable base 20 and fixed to the headrest stay 4c together with the rear cover 4b. The fixed base 10 includes a fixed plate 11 which extends vertically and connection portions 12a, 12b which are plates perpendicularly extended from side end portions of the fixed plate 11 towards the movable base 20.

A back surface 11a of the fixed plate 11 is in contact with the headrest stay 4c. The drive portion 7 is fixed on a front surface 11b of the fixed plate 11. The connecting portion 30 is connected to the connection portions 12a, 12b.

The front cover 4a (shown in FIGS. 1-2) is fixed to a front side of the movable base 20. The movable base 20 includes a movable plate 21 extended vertically, and connection portions 22a, 22b extended approximately perpendicular to the fixed base 10 from side end portions of the movable plate 21 respectively.

The movable plate 21 is arranged approximately parallel to the fixed plate 11 of the fixed base 10. The front cover 4a is fixed on a front surface 21a of the movable plate 21. Accordingly, the movable plate 21 supports a head of an occupant seated on the seat 2 through the front cover 4a. The connection portions 22a, 22b are connected to the connecting portion 30.

The connecting portion 30 is positioned between the movable base 20 and the fixed base 10, and includes a connecting shaft 31 extended approximately parallel to the fixed plate 11 and the movable plate 21, and a pair of X-links 32a, 32b connected by the connecting shaft 31.

The connecting shaft 31 is arranged to be approximately perpendicular to a rotational direction of the X-links 32a, 32b, and is connected to the output shaft 7a of the drive portion 7 by means of a link mechanism 8. The connecting shaft 31 is selectively biased forward (i.e., to the left in FIGS. 4 and 5) or backward (i.e., to the right in FIGS. 4 and 5) in accordance with a rotational direction of the output shaft 7a.

The X-links 32a, 32b are provided at first and second ends of the connecting shaft 31 respectively. The X-links 32a, 32b include first links 33a, 33b and second links 34a, 34b. The first link 33a and the second link 34a are positioned to cross each other so as to rotate about the connecting shaft 31. The first link 33b and the second link 34b are positioned to cross each other so as to rotate about the connecting shaft 31.

The first links 33a, 33b are slidably connected to the fixed base 10 and the movable base 20. More particularly, slits 13a, 13b vertically extended are formed at bottom ends of the connection portions 12a, 12b of the fixed base 10 respectively. Slidable connecting shafts 35a, 35b are provided at first ends (i.e., rear ends) of the first links 33a, 33b. The slidable connecting shafts 35a, 35b are accommodated in the slits 13a, 13b respectively so that the first links 33a, 33b are slidably connected to the fixed base 10. Slide guiding bores 23a, 23b which extend vertically are formed at top ends of the connection portions 22a, 22b of the movable base 20 respectively. Slidable connecting shafts 36a, 36b are provided at second ends (i.e., front ends) of the first links 33a, 33b respectively. The slidable connecting shafts 36a, 36b are accommodated in the slide guiding bores 23a, 23b respectively so that the first links 33a, 33b are slidably connected to the movable base 20.

The second links 34a, 34b are rotatably connected to the fixed base 10 and the movable base 20. Connection holes 14a, 14b are formed at top ends of the connection portions 12a, 12b of the fixed base 10 respectively. Rotatable connecting shafts 37a, 37b are provided at first ends (i.e., rear ends) of the second links 34a, 34b respectively. The rotatable connecting shafts 37a, 37b are accommodated in the connection holes 14a, 14b respectively so that the second links 34a, 34b are rotatably connected to the fixed base 10. Connection holes 24a, 24b are respectively provided at bottom ends of the connection portions 22a, 22b of the movable base 20 (shown in FIGS. 4-6). Rotatable connecting shafts 38a, 38b are provided at second ends (i.e., front ends) of the second links 34a, 34b respectively. The rotatable connecting shafts 38a, 38b are respectively fitted into the connection holes 24a, 24b so that the second links 34a, 34b are rotatably connected to the movable base 20.

The slide guiding bores 23a, 23b, which the slidable connecting shafts 36a, 36b of the first links 33a, 33b respectively are fitted through, are configured to allow the slidable connecting shafts 36a, 36b to move in a front-back direction of the headrest (i.e., there is a clearance between the connecting shafts 36a, 36b and the slide guiding bores 23a, 23b respectively). Referring to FIGS. 7-8, constructions of the slidable connecting shafts 36a, 36b and the slide guiding bores 23a, 23b will be explained in details as follows.

As explained above, the first links 33a, 33b are slidably connected to the movable base 20 by fitting the slidable connecting shafts 36a, 36b into the slide guiding bores 23a, 23b respectively. More particularly, each of the slidable connecting shafts 36a, 36b of the first links 33a, 33b includes a pin 51 (i.e., serving as a slidable connecting shaft) which penetrates the first links 33a, 33b in a plate thickness direction, and a bushing 52 (i.e., serving as a slidable connecting shaft) provided coaxially to the pin 51.

Front sidewall surfaces 61a, 61b are concaved at the slide guiding bores 23a, 23b. The slide guiding bores 23a, 23b has width W1 which is longer than diameter D1 of the bushing 52 (shown in FIG. 7A). The bushing 52 includes a flange portion 52a which projects outward in a radial direction from an end thereof. An external diameter of the flange portion 52a is longer than the width W1 of the slide guiding bores 23a, 23b. Accordingly, the movable base 20 moves (i.e., rotates) backward rotating about the rotatable connecting shafts 38a, 38b within a range (i.e., serving as a clearance between the slidable connecting shafts and the slide guiding bores respectively) allowed by the width W1 of the slide guiding bore 23a, 23b, and thus the first links 33a, 33b and the movable base 20 are selectively contacted to each other or separated from each other.

Figure 7B:
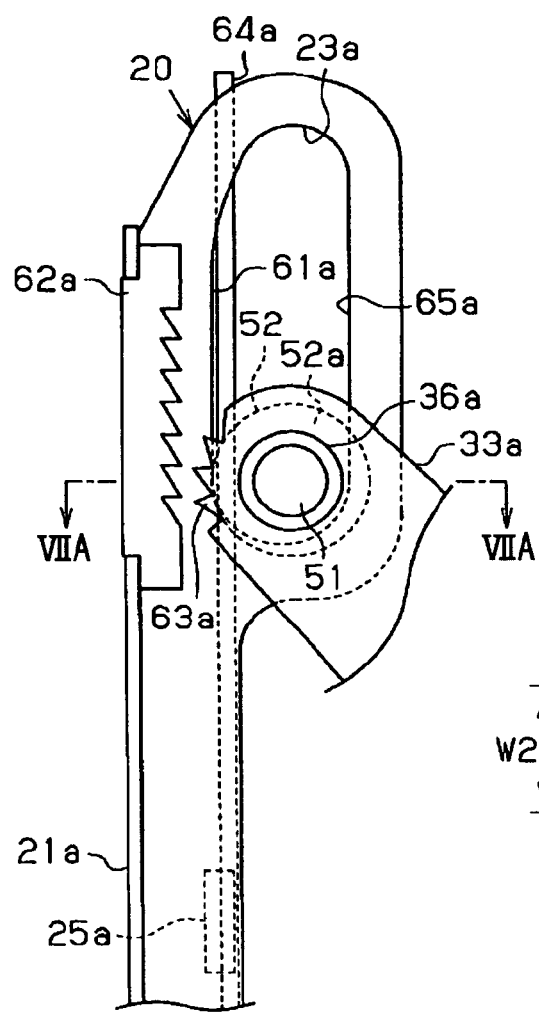
FIG. 7B is a magnified view of a portion A in FIG. 5 according to the embodiment of the present invention.
Figure 7A:
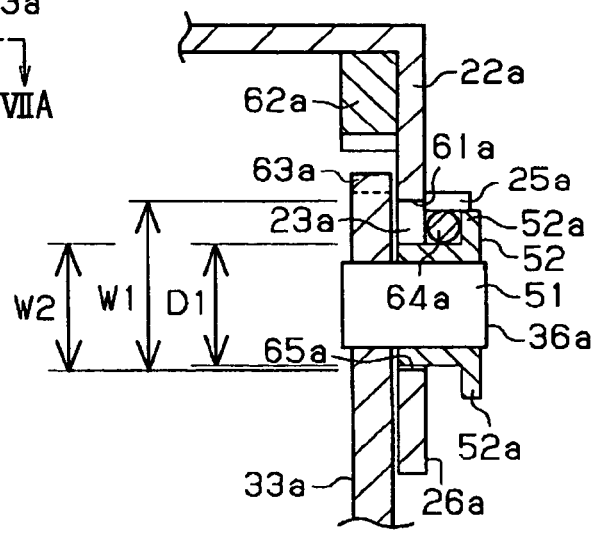
FIG. 7A is a cross-sectional view of FIG. 7B taken on line 7A-7A according to the embodiment of the present invention.
Figure 8B:
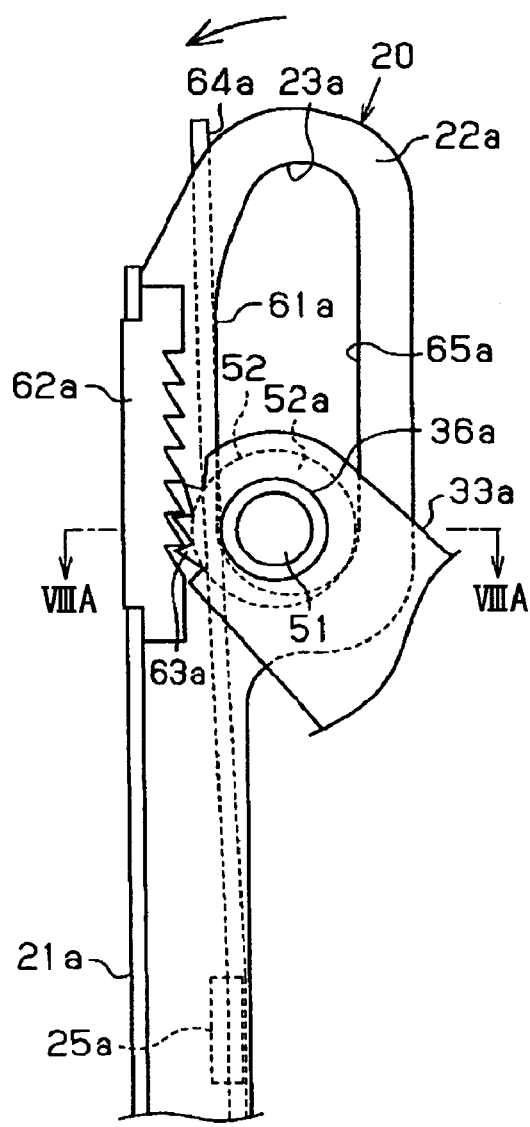
FIG. 8B is a magnified view of a portion B in FIG. 6 according to the embodiment of the present invention.
Figure 8A:
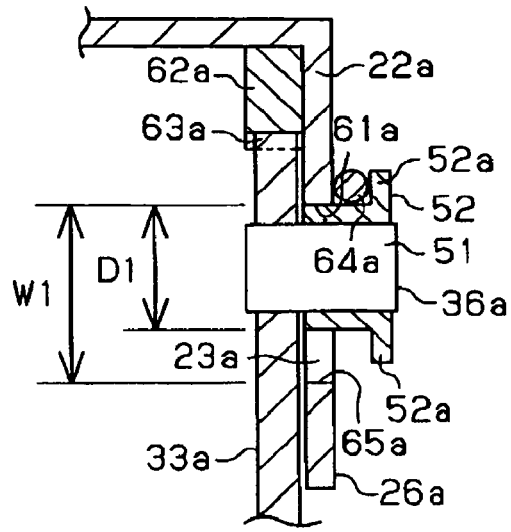
FIG. 8A is a cross-sectional view of FIG. 8B taken on line 8A-8A according to the embodiment of the present invention.

The slide guiding bores 23a, 23b are long bores which include a wider width portion and a narrower width portion, which a narrower width portion narrows gradually, as shown in FIG. 7B. The slidable connecting shafts 36a, 36b are fitted into the narrower width portion of the slide guiding bores 23a, 23b, respectively, when the movable base 20 is retracted. The slidable connecting shafts 36a, 36b are in the wider width portion of the slide guiding bores 23a, 23b, respectively, when the movable base 20 is deployed. Accordingly, a clearance between the slidable connecting shafts 36a, 36b and the slide guiding bores 23a, 23b, respectively, in a state where the movable base 20 is retracted becomes narrower than a clearance between the slidable connecting shafts 36a, 36b and the slide guiding bores 23a, 23b, respectively, in a state where the movable base 20 is deployed or in a process of being deployed from the fixed base 10. According to the foregoing construction, shakiness of the headrest can be prevented in a state where the movable base 20 is retracted.

The movable base 20 is provided with latches 62a, 62b (i.e., serving as a relative rotation restricting portion; serving as a second engaging portion) which contact the first links 33a, 33b respectively by a relative rotation between the movable base 20 and the second links 34a, 34b about the rotatable connecting shafts 38a, 38b.

The latches 62a, 62b are provided at positions where the latches 62a, 62b contact the first links 33a, 33b of the movable plate 21, and are extended in a sliding direction of the first links 33a, 33b. Plural teeth 63a, 63b (i.e., serving as a first engaging portion) are formed at the second end portions of the first links 33a, 33b opposing to the latches 62a, 62b respectively. A movement of the slidable connecting shafts 36a, 36b in the slide guiding bores 23a, 23b is prevented by a respective engagement between the first links 33a, 33b (i.e., serving as a first engaging portion) and the latches 62a, 62b (i.e., serving as a second engaging portion). Namely, a sliding movement of the slidable connecting shafts 36a, 36b in the slide guiding bores 23a, 23b is locked (prevented) by a latch mechanism including the teeth 63a, 63b (i.e., the first engaging portion) of the first links 33a, 33b and the latches 62a, 62b (i.e., second engaging portion).

Springs 64a, 64b are provided at the movable base 20. The springs 64a, 64b formed in a bar/stick shape extended in a longitudinal direction of the slide guiding bores 23a, 23b. The springs 64a, 64b are provided between the connection portions 22a, 22b of the movable base 20 and the flange portion 52a of the bushing 52 respectively in a plate thickness direction (i.e., right, left direction in FIGS. 7A and 8A) of the connection portions 22a, 22b, and are fixed to outer surfaces 26a, 26b of the connection portions 22a, 22b by means of fixing support portions 25a, 25b respectively.

The springs 64a, 64b are positioned distance W2 distant from rear side wall surfaces 65a, 65b of the slide guiding bores 23a, 23b respectively, which distance W2 is shorter than the width W1 of the slide guiding bores 23a, 23b in a front-back direction and is longer than diameter D1 of the slidable connecting shafts 36a, 36b. A movement of the slidable connecting shafts 36a, 36b towards the front side wall surfaces 61a, 61b is prevented by the springs 64a, 64b respectively. Accordingly, the first links 33a, 33b slide relative to the movable base 20 without contacting the latches 62a, 62b.

Further, the springs 64a, 64b have elasticity, and the springs 64a, 64b are configured to deflect forward when a force greater than a predetermined load (e.g., a load applied to the movable base 20 and transmitted to the slidable connecting shafts 36a, 36b when the headrest device 1 supports a head of an occupant at rear-end collision) is applied thereto from the slidable connection shafts 36a, 36b. Namely, when a head of an occupant is supported by the movable base 20 at the rear-end collision, the teeth 63a, 63b of the first links 33a, 33b engage with the latches 62, 62b respectively. In a normal state, respective contacts between the latches 62a, 62b and the first links 33a, 33b are prevented by a biasing force of the springs 64a, 64b. When the vehicle is rear-ended, the springs 64a, 64b are deflected in accordance with a load applied to the movable base 20 so that the latches 62a, 62b contact the first links 33a, 33b respectively.

Figure 4:
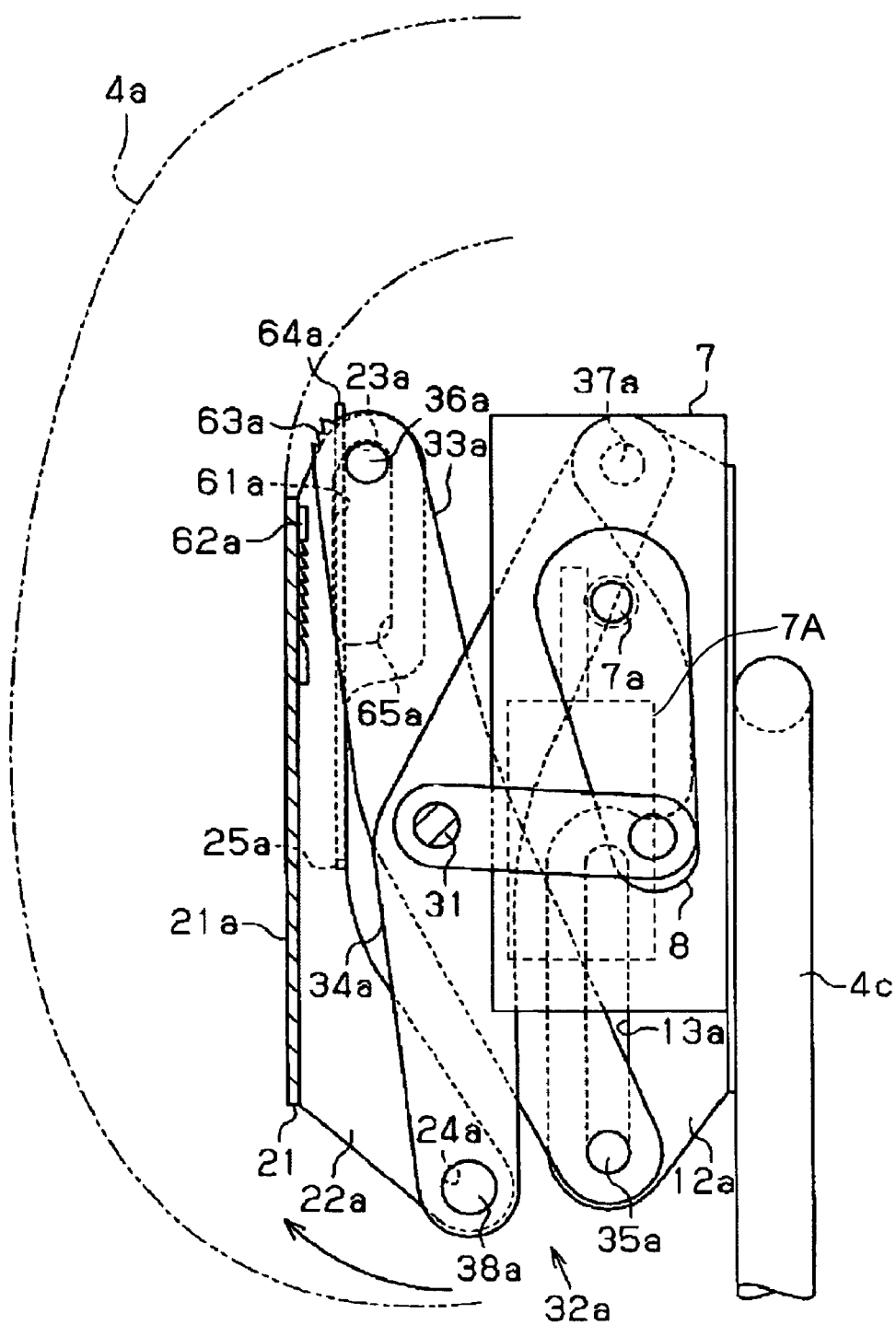
FIG. 4 is a lateral view of the headrest device according to the embodiment of the present invention.
Figure 5:
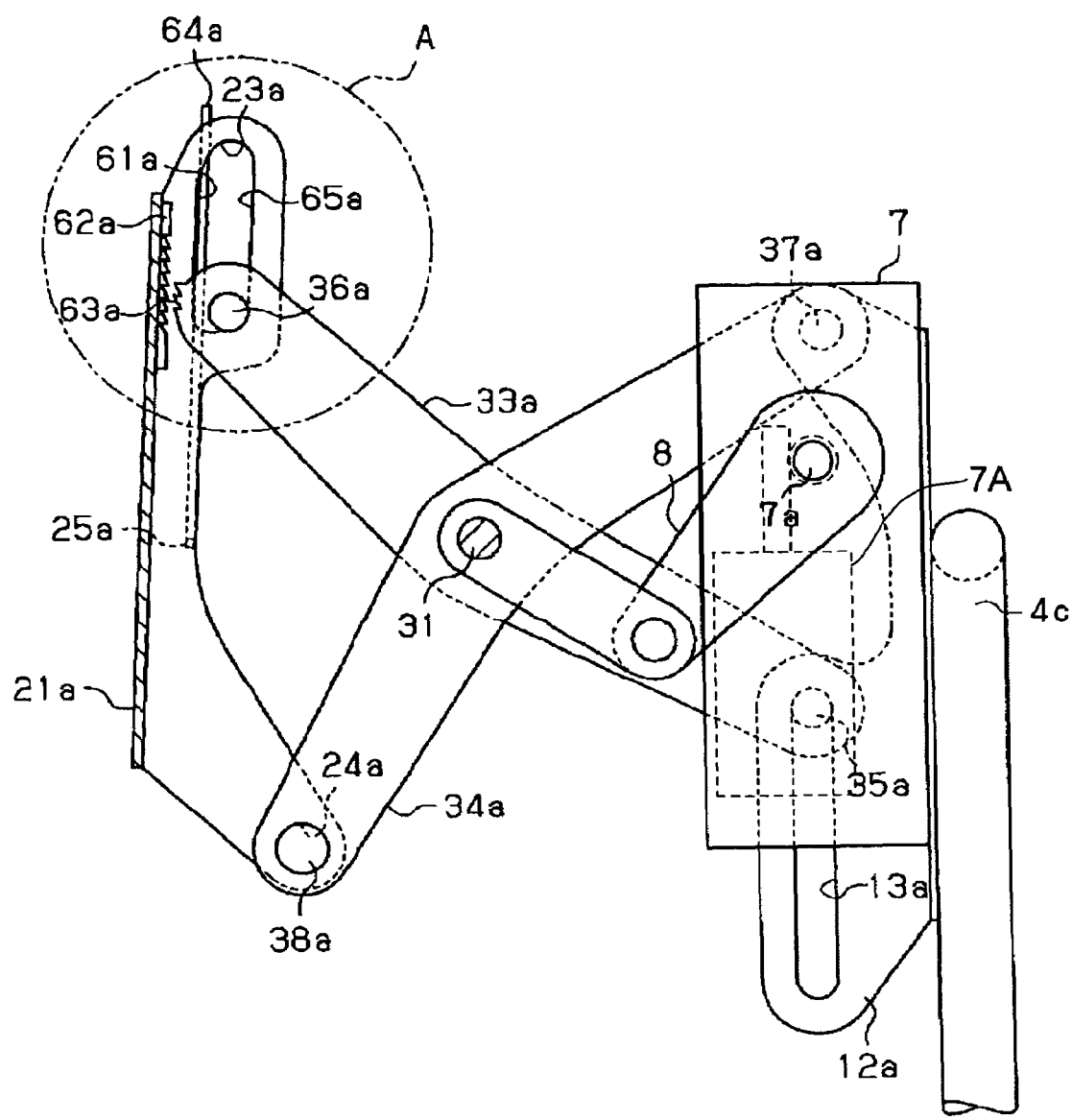
FIG. 5 is a lateral view of the headrest device according to the embodiment of the present invention.

Operations when the headrest device 1 is deployed and retracted will be explained as follows. As shown in FIGS. 4-5, a rear end collision is detected or predicted by the sensor 6, and the X-links 32a, 32b are driven on the basis of a control signal transmitted from the controller 5 to move (deploy) the movable base 20 to be away from the fixed base 10 (See FIGS. 1 and 2). More particularly, the connecting shaft 31, which connects the X-links 32a and 32b, is instantly moved forward by the link mechanism 8. In accordance with the movement of the connecting shaft 31, the first links 33a, 33b and the second links 34a, 34b rotate in opposite directions from one another about the connecting shaft 31. By the forward movement of the connecting shaft 31, the second links 34a, 34b rotate counterclockwise in FIG. 4 about the rotatable connecting shafts 37a, 37b. The first links 33a, 33b are guided by the slits 13a, 13b and the slidable guiding bores 23a, 23b respectively to rotate counterclockwise about the connecting shaft 31.

That is, by the forward movement of the connecting shaft 31, the first links 33a, 33b and the second links 34a, 34b rotate about the connecting shaft 31 in opposite directions from one another to move the movable base 20 to be away from the fixed base 10. By a series of movements of the first links 33a, 33b and the second links 34a, 34b, the X-links 32a, 32b rotate, and the movable base 20 is deployed away from the fixed base 10 to stop at the forward position (i.e., shown in FIG. 2).

Because the first ends of the second links 34a, 34b are connected to top end portions of the fixed base 10 and the second ends of the second links 34a, 34b are connected to bottom end portions of the movable base 20, when the second links 34a, 34b rotate clockwise in FIG. 4 about the rotatable connecting shafts 37a, 37b, the movable base 20 is deployed away from the fixed base 10 and moves upward relative to the fixed base 10. Accordingly, the headrest device 1 is deployed forward while displacing in an obliquely upward direction.

An operation of the headrest device 1 when retracting will be explained as follows. For example, when it is judged that a safe of an occupant is ensured, by detected signals from the sensor 6 or by settings of a release switch provided in a vehicle compartment, the drive portion 7 drives the X-links 32a, 32b on the basis of control signals from the controller 5 so that the movable base 20 retracts back to the fixed base 10. More particularly, first, the connecting shaft 31, which connects the X-links 32a and 32b, moves backward by the link mechanism 8. In accordance with the movement of the connecting shaft 31, the first links 33a, 33b and the second links 34a, 34b rotate about the connecting shaft 31 in the opposite directions from one another. By the rearward movement of the connecting shaft 31, the second links 34a, 34b rotate counterclockwise in FIG. 5 about the rotatable connecting shafts 37a, 37b. The first links 33a, 33b are guided by the slits 13a, 13b and the slidable guiding bores 23a, 23b, respectively, to rotate clockwise about the connecting shaft 31. Namely, because the connecting shaft 31 moves rearward, the first links 33a, 33b and the second links 34a, 34b rotate about the connecting shaft 31 and the movable base 20 retracts back to the fixed base 10. By a series of operations of the first links 33a, 33b and the second links 34a, 34b, the X-links 32a, 32b rotate and the movable base 20 retracts back to the fixed base 10 to stop at a retracted position. Accordingly, the headrest device 1 is retracted rearward.

Figure 6:
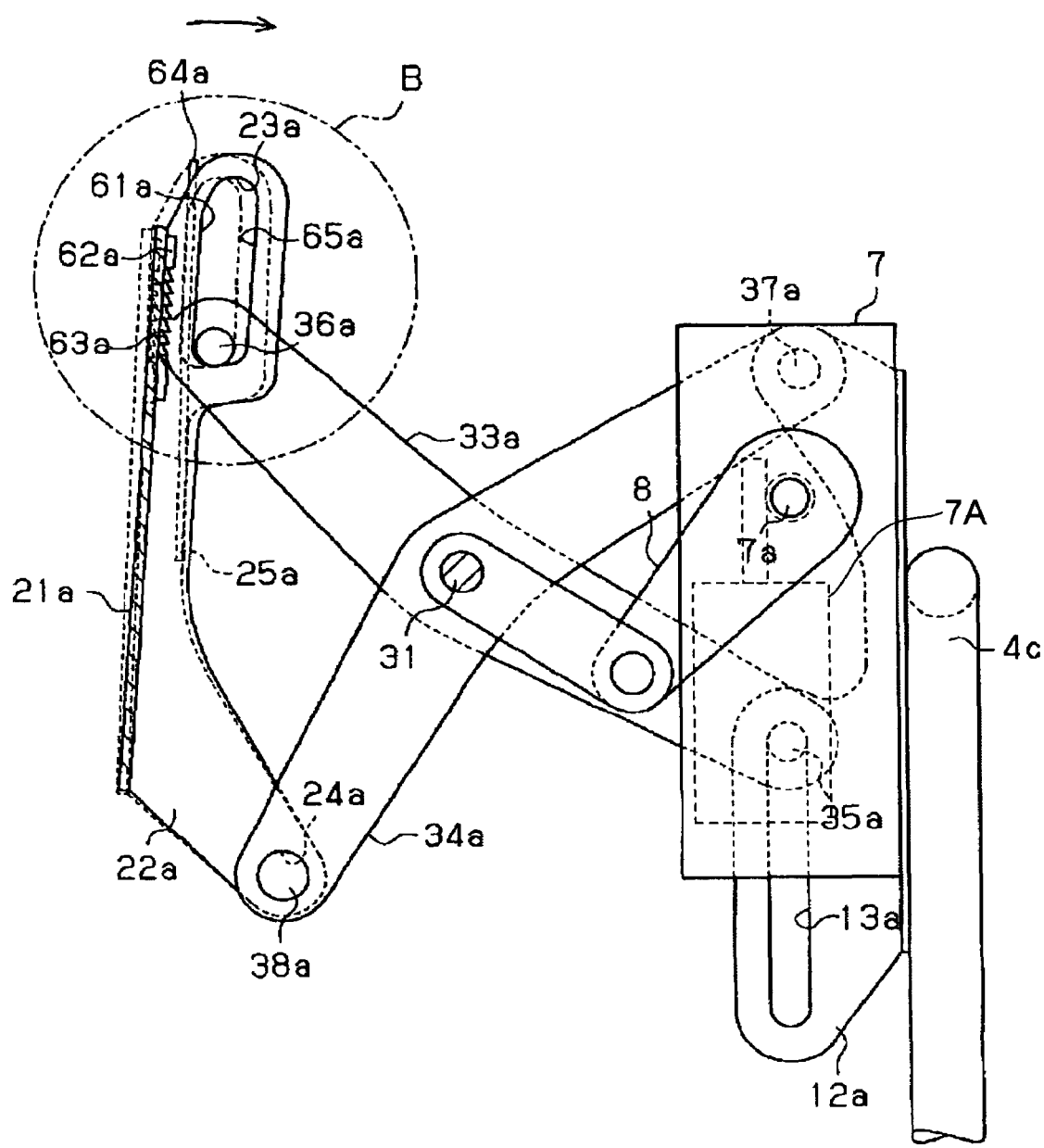
FIG. 6 is a lateral view of the headrest device according to the embodiment of the present invention.

An operation of the headrest device 1 at a rear-end collision will be explained as follows. As shown in FIGS. 6-8, when a load greater than a predetermined load is applied from a front side of the headrest device 1 (i.e., a head of an occupant is supported by the movable base 20 at a rear-end collision), the springs 64a, 64b are deflected, and a top end portion of the movable base 20 is tilted towards the fixed base 10 pivotally about the rotatable connecting shafts 38a, 38b. Accordingly, the front side wall surfaces 61a, 61b of the slide guiding bores 23a, 23b move towards the slidable connecting shafts 36a, 36b, the teeth 63a, 63b of the first links 33a, 33b and the latches 62a, 62b of the movable base 20 contact one another, and the latches 62a, 62b are engaged with the teeth 63a, 63b formed on the first links 33a, 33b respectively (shown in FIGS. 7 and 8). Accordingly, the slide movement of the first links 33a, 33b is restricted by the latch mechanism including the latches 62a, 62b and the teeth 63a, 63b. Because the second links 34a, 34b connected to the movable base 20 is configured to be allowed only to rotate, relative rotations between the first links 33a, 33b and the second links 34a, 34b are prevented when the slide movement of the first links 33a, 33b is prevented.

In a state where the latches 62a, 62b and the first links 33a, 33b are engaged respectively, the slidable connecting shafts 36a, 36b are biased towards the rear side wall surfaces 65a, 65b by the deflection of the springs 64a, 64b. Thus, when a degree of a load applied to the movable base 20 becomes equal to or less than a predetermined load, the slidable connecting shafts 36a, 36b move to the rear side wall surfaces 65a, 65b in the slide guiding bores 23a, 23b, and the respective engagements between the teeth 63a, 63b and the latches 62a, 62b are released. That is, the springs 64a, 64b serve as a biasing portion which separates the first links 33a, 33b from the latches 62a, 62b. Thus, the first links 33a, 33b and the second links 34a, 34b become relatively rotatable, and the X-links 32a, 32b enable to relatively move the movable base 20 and the fixed base 10 again. When the load applied to the movable base 20 is equal to or less than the predetermined load, relative rotations between the first links 33a, 33b and the second links 34a, 34b are not restricted because the first links 33a, 33b and the latches 62a, 62b are not engaged.

According to the embodiment of the present invention, the following effects are obtained.

(1) The load applied to the movable base 20 is supported by the fixed base 10 and the connecting portion 30 at which the relative rotation between the first links 33a, 33b and the second links 34a, 34b is restricted by the latches (i.e., relative rotation restricting portion) 62a, 62b. Accordingly, the movable base 20 securely supports a head of an occupant at a position apart from the fixed base 10, where the movable base 20 is not retracted back by a load imposed thereon at a rear-end collision. The load which is applied to the movable base 20 is supported by the connecting portion 30 and the fixed base 10 and is not transmitted to the drive portion 7. Accordingly, for example, when a motor is applied as the drive portion 7, a small size motor can be used because a torque having a degree that can support a load applied to the movable base is not necessary. Further, in case a spring is applied as the drive portion, elastic force that can support a load applied to the movable base is not necessary. Accordingly, a smaller size drive portion than known headrest devices can be applied, which contributes to lightening and downsizing the headrest device.

(2) Slide movement of the slidable connecting shafts 36a, 36b which are slidably connected to the movable base 20 is restricted by a load applied to the movable base 20, and rotations of the first links 33a, 33b and the second links 34a, 34b about the connecting shaft 31 are restricted. Accordingly, relative rotations between the first links 33a, 33b and the second links 34a, 34b are restricted on the basis of a degree of a load applied to the movable base 20, and a distance between the movable base 20 and the fixed base 10 can be maintained.

(3) Because the springs (i.e., biasing portion) 64a, 64b bias the first links 33a, 33b and the latches (i.e., relative rotation restricting portion) 62a, 62b to separate from each other respectively, the latches (i.e., relative rotation restricting portion) 62a, 62b are disengaged from the first links 33a, 33b respectively when a load applied to the movable base 20 becomes less than a biasing force of the springs 64a, 64b. Accordingly, relative rotations between the first links 33a, 33b and the second links 34a, 34b respectively can be achieved. Namely, a restriction (i.e., respective engagements between the latches 62a, 62b and the teeth 63a, 63b) by the relative rotation restricting portion can be released without manual operation by an occupant.

(4) Slide movement of the first links 33a, 33b is restricted by the latch mechanism including the teeth 63a, 63b serving as a first engaging portion respectively provided at the first links 33a, 33b, and the latches 62a, 62b serving as a second engaging portion provided at the movable base 20. Accordingly, for example, compared to a case where a slide movement of the first links are prevented by frictions, the slide movement of the first links can be restricted more securely. Further, because the latches 62a, 62b are arranged along a sliding direction of the slidable connecting shafts 36a, 36b, engageable positions between the latches 62a, 62b and the teeth 63a, 63b are determined with short intervals in a sliding direction of the first links 33a, 33b. This construction enables the headrest device to flexibly respond to contact positions between the first links 33a, 33b and the latches 62a, 62b respectively, which contact positions vary in accordance with a relative distance between the movable base 20 and the fixed base 10. That is, relative movement between the movable base 20 and the fixed base 10 can be restricted even in a state where the movable base 20 is not fully moved to the forward position.

(5) By rotating the motor 7A in a normal direction or reverse direction, the headrest device 1 can be deployed or retracted without manual operation by an occupant.

The embodiment of the present invention may be modified as described below.

According to the embodiment of the present invention, the springs 64a, 64b serving as the biasing member are provided. In a modified example which does not include springs (a biasing member), aforementioned effects (1) and (2) can be achieved.

Although the movable base 20 is driven by the motor 7A in a direction being away from the fixed base by the motor 7A which can rotate in a normal direction and a reverse direction with the construction of the foregoing embodiment, the construction of the present invention is not limited. For example, the movable base and the fixed base may be biased in a direction deployed away from each other by a biasing force of a spring. A load applied to the headrest device at rear-end collision is supported by the connection portion by a restriction of the rotation between the first links and the second links. Accordingly, a head of an occupant can be appropriately supported even if the spring does not have an elastic force which can support a load applied to the movable base, and thus contributing to downsizing a drive portion.

Although the connecting portion 30 includes pairs of X-links 32a and 32b which are connected by the connecting shaft 31 according to the embodiment of the present invention, equal to or more than three links may be applied. Further, although a single X-link may be provided on the connecting portion 30, in that case, a guide member which supports an attitude of the X-link and a movement in a thickness direction is required.

With the construction of the embodiment, the latches 62a, 62b are provided at the positions which contact the first links 33a, 33b when the movable base 20 moves rearward, and a slide movement of the first links 33a, 33b is restricted by the latch mechanism including the teeth 63a, 63b serving as the first engaging portion and the latches 62a, 62b serving as the second engaging portion. However, the construction of the present invention is not limited to this construction. For example, the second engaging portion may be a groove or/and a pin, or the like, which is formed at a position contacting the first links of the movable base, and is variable. Also, the construction of the first engaging portion can be varied likewise. Further, a fitting portion which fits to the slidable connecting shaft may be provided on the front side wall surface of the slide guiding bore, and the slide movement of the first links may be restricted by fitting the slide connecting shaft and the fitting portion.

Although the bar shaped springs 64a, 64b are applied as the biasing portion according to the embodiment, the construction of the present invention is not limited to this construction. For example, a biasing portion (e.g., a spring) which makes the movable base tilt in a direction to disengage the latches and the first links may be provided at a bottom end portion of the movable base. It is preferable to set a biasing force by the biasing portion so that the relative rotation restricting portion and the first links are appropriately engaged when a load is applied to the movable base at a rear-end collision. Further, for example, in this case, provided that the position of the center of the gravity at the movable base is set to constantly tilt forward about the connection portion with the second links, a state where the first links and the latches are disengaged can be maintained without providing additional members.

As shown in FIGS. 9-10, a hook 73 which contacts a spring 71 from the same side with a slidable connecting shaft 72 may be provided. With this construction, a movement of the spring 71 towards the slidable connecting shaft 72 is prevented by the hook 73, and a risk of a slide movement of the slidable connecting shaft 72 in a slide guiding bore 74 is reduced by the spring 71.

Although the latches (i.e., the relative rotation restricting portion) 62a, 62b are provided on the movable base 20 and the teeth 63a, 63b are provided at the side of the first links 33a, 33b that is close to the movable base 20 according to the embodiment, for example, the latches 62a, 62b and the teeth 63a, 63b of the first links 33a, 33b may be provided at the side closer to or on the fixed base. In this regard, with the construction according to the embodiment, the latches (i.e., relative rotation restricting portion) 62a, 62b and the respective first links 33a, 33b can be contacted more securely when a load is imposed on the movable base 20 compared to a case when the latches (i.e., relative rotation restricting portion) are provide at the fixed base.

Although the latches (i.e. relative rotation restricting portion) 62a, 62b are provided at a top end portion of the movable base 20 according to the embodiment, the relative rotation restricting position may be provided at a bottom end portion of the movable base, and construction can be varied. In this regard, the latches may be more securely engaged with the first links when the latches are provided at the top end portion of the movable base than at the bottom end portion because the movable base supports a head of an occupant at the top end thereof at rear-end collision.

Although the connecting portion 30 is driven by the link mechanism 8 according to the embodiment, a method for transmitting a drive force from the drive portion to the connection portion may be varied.

Although the second links 34a, 34b are connected to the top end portion of the fixed base 10 and the bottom end portion of the movable base 20 so as to rotate according to the embodiment, the construction of the present invention is not limited. For example, the first links may be connected to the top end portion of the fixed base and the bottom end portion of the movable base so as to slide. With the construction of the embodiment that the second links 34a, 34b are connected to the top end portion of the fixed base 10 and the bottom end portion of the movable base 20 to rotate and the movable base 20 is deployed forward while being displaced obliquely upward, the headrest device 1 which can follow a behavior of a head of an occupant, which is likely floated upward when a vehicle is rear-ended, can be attained.

Although the first links 33a, 33b are connected to the fixed base 10 and the movable base 20 to be slidable and the second links 34a, 34b are connected to the fixed base 10 and the movable base 20 to be rotatable according to the embodiment, the construction of the present invention is not limited to this construction. For example, a first end of a first link may be connected to a fixed base and a movable base to be rotatable and a second end of the first link may be connected to the fixed base and the movable base to be slidable, and constructions can be varied.

Although the movable base 20 is retracted by actuating the drive portion 7 according to the embodiment, the construction of the present invention is not limited to this construction. For example, the movable base 20 may be moved rearward by biasing the bottom end of the movable base 20 rearward by a manual operation of an occupant.

Although the X-links 32a and 32b are provided at respective ends of the connecting shaft 31 and are driven integrally by means of the connecting shaft 31, the construction of the present invention is not limited to this construction. In this regard, by integrally driving the X-links 32a and 32b by means of the connecting shaft 31, operations of the X-links 32a and 32b accord with each other, which enables to securely support a head of an occupant.

According to the embodiment of the present invention, a distance between the movable base and the fixed base is maintained when the movable base retracts back to (i.e. approaches) or deploys away from the fixed base in accordance with a relative rotation between the first links and the second links, and when the relative rotation between the first links and the second links is restricted by the relative rotation restricting portion. Accordingly, for example, the movable base can securely support a head of an occupant at a position deployed away from the fixed base without being moved back by a load applied to the movable base at rear-end collision. Further, because the load applied to the movable base is supported by the fixed base and the connection portion where the relative rotation between the first links and the second links is restricted, the load imposed on the movable base is not transmitted to the drive portion. Thus, for example, when a motor is applied as the drive portion, a small size motor can be applied because a torque with a degree, which can support the load applied to the movable base, is not necessary. Further, when a spring is applied as the drive portion, elastic force with a degree, which can support the load applied to the movable base, is not necessary. Accordingly, compared to the known headrest devices, a smaller size drive portion can be used, which contributes to lightening and downsizing the headrest device.

According to the embodiment of the present invention, a slide movement of the slidable connecting shaft which is slidably connected to the movable base is restricted by a load applied to the movable base. When a slide movement of the first links is prevented at at least one of the movable base and the fixed base which are connected to the second links which is only allowed to rotate, a rotation of the first links and the second links about the connecting shaft is restricted. Accordingly, a relative rotation between the first links and the second links is restricted in accordance with a degree of the load applied to the movable base, and a predetermined distance between the movable base and the fixed base can be maintained.

According to the embodiment of the present invention, because the first links and the relative rotation restricting portion are biased to be disengaged from each other by biasing force of the biasing portion, when a degree of a load applied to the movable base becomes less than the biasing force of the biasing portion, the first links and the relative rotation restricting portion are disengaged so as to release a restriction by the relative rotation restricting portion. Accordingly, the restriction by the relative rotation restricting portion can be released without manual operation by an occupant.

According to the embodiment of the present invention, compared to the known construction that a slide movement of a first link is prevented by friction, a slide movement of the slidable connecting shaft along the slide guiding bore can be securely restricted.

According to the embodiment of the present invention, because the biasing portion is deflected, for example, towards the slidable connecting shaft, a slide movement of the slidable connecting shaft is not prevented.

According to the embodiment of the present invention, the headrest device can be deployed or retracted by rotating the motor in a normal direction or reverse direction.

According to the embodiment of the present invention, shakiness of the headrest can be prevented in a state where the movable base is retracted.

According to the present invention, a headrest device which securely supports a head of an occupant, prevents an application of a load by the head at a rear-end collision, and contributes to lightening and downsizing thereof can be provided.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest device, comprising:
   a fixed base being supported by a seatback;
   a movable base disposed at a forward position relative to the fixed base;
   at least one first link being rotatably supported by a connecting shaft provided between the movable base and the fixed base, the first link having a first end connected to the movable base and a second end connected to the fixed base;
   at least one second link being supported by the connecting shaft so as to rotate relative to the first link, the second link having a first end connected to the movable base and a second end connected to the fixed base;
   a connection portion including the first link and the second link and connecting the movable base and the fixed base to be relatively movable by a relative rotation between the first link and the second link;
   a drive portion relatively rotating the first link and the second link in a direction so as to deploy the movable base away from the fixed base on the basis of a detected result by a rear-end collision detection means which is connected to the connection portion to detect and/or predict a vehicle rear-end collision;
   at least one relative rotation restricting portion provided at a portion of the fixed base and/or the movable base; and
   a biasing portion for biasing the first link away from the at least one relative rotation restricting portion,
   the at least one relative rotation restricting portion restricting a relative rotation between the first link and the second link about the connecting shaft when a load larger than a biasing force of the biasing portion is applied to the movable base upon the vehicle rear-end collision and when subsequent rearward movement of the movable base establishes an engagement thereof with the first link,
   the at least one relative rotation restricting portion allowing the relative rotation between the first link and the second link about the connecting shaft when the load applied to the movable base is smaller than the biasing force of the biasing portion and when the resulting disengagement of the movable base from the first link is established.

2. The headrest device according to claim 1, wherein at least one of the fixed base and the movable base is formed with a slide guiding bore, and at least one of the fixed base and the movable base is provided with a connection hole, a slidable connecting shaft provided at the first link penetrates the slide guiding bore, and a rotatable connecting shaft provided at the second link Penetrates through the connection hole, wherein the slide guiding bore has a width wider than a width of the slidable connecting shaft in a moving direction of the movable base and guides the slidable connecting shaft moving along said at least one of the fixed base and the movable base in accordance with the relative rotation between the first link and the second link; and wherein
   the relative rotation restricting portion prevents a movement of the slidable connecting shaft in the slide guiding bore by a rearward movement of the movable base by the load within the width of the slide guiding bore.

3. The headrest device according to claim 1,
   wherein a first engaging portion and a second engaging portion are provided, respectively, at the first link and at the relative rotation restricting portion to constitute a latch mechanism, the first engaging portion and the second engaging portion being selectively in meshing engagement with each other.

4. The headrest device according to claim 1, wherein the biasing portion is formed in a bar shape extended in a sliding direction of the slidable connecting shaft; and further comprising a hook selectively contacting the biasing portion to limit movement of the slidable connecting shaft in a direction away from the at least one relative rotation restricting portion.

5. The headrest device according to claim 3, wherein the biasing portion is formed in a bar shape extended in a sliding direction of the slidable connecting shaft; and further comprising a hook selectively contacting the biasing portion to limit movement of the slidable connecting shaft in a direction away from the at least one relative rotation restricting portion.

6. The headrest device according to claim 1, wherein
the drive portion includes a motor which is capable of selectively rotating in a normal and reverse direction as a drive source;
the first link and the second link selectively rotate in a normal and reverse direction about the connecting shaft; and
the movable base retracts back to or deploys away from the fixed base in accordance with a rotational direction of the first link and the second link about the connecting shaft.

7. The headrest device according to claim 3, wherein
the drive portion includes a motor which is capable of selectively rotating in a normal and reverse direction as a drive source;
the first link and the second link selectively rotate in a normal and reverse direction about the connecting shaft; and
the movable base retracts back to or deploys away from the fixed base in accordance with a rotational direction of the first link and the second link about the connecting shaft.

8. The headrest device according to claim 4, wherein
the drive portion includes a motor which is capable of selectively rotating in a normal and reverse direction as a drive source;
the first link and the second link selectively rotate in a normal and reverse direction about the connecting shaft; and
the movable base retracts back to or deploys away from the fixed base in accordance with a rotational direction of the first link and the second link about the connecting shaft.

9. The headrest device according to claim 5, wherein
the drive portion includes a motor which is capable of selectively rotating in a normal and reverse direction as a drive source;
the first link and the second link selectively rotate in a normal and reverse direction about the connecting shaft; and
the movable base retracts back to or deploys away from the fixed base in accordance with a rotational direction of the first link and the second link about the connecting shaft.

10. The headrest device according to claim 3, wherein the first engaging portion and the second engaging portion are arranged to face each another when the movable base is deployed.

11. The headrest device according to claim 3, wherein the second engaging portion is provided at the movable base.

12. The headrest device according to claim 2, wherein a clearance between the slidable connecting shaft and the slide guiding bore in a state where the movable base is retracted is narrower than a clearance between the slidable connecting shaft and the slide guiding bore in a state where the movable base is deployed.

13. A headrest device, comprising:
a fixed base supported by a seatback;
a movable base disposed at a forward position relative to the fixed base;
at least one first link being rotatably supported by a connecting shaft provided between the movable base and the fixed base, the first link having a first end connected to the movable base and a second end connected to the fixed base;
at least one second link supported by the connecting shaft to rotate relative to the first link, the second link having a first end connected to the movable base and a second end connected to the fixed base;
the first link and the second link connecting the movable base and the fixed base to be relatively movable by relative rotation between the first link and the second link;
rear-end collision detection means for detecting and/or predicting a vehicle rear-end collision;
a drive portion operatively connected to the connecting shaft to relatively rotate the first link and the second link to move the movable base away from the fixed base based on a result detected by the rear-end collision detection means;
a first engaging portion provided on the first link;
a second engaging portion provided on the movable base, the second engaging portion being engageable with the first engaging portion to restrict relative rotation between the first and second links;
a spring applying a biasing force to the first link biasing the first and second engaging portions away from one another;
the engagement of the first and second engaging portions restricting the relative rotation between the first link and the second link about the connecting shaft when a load larger than the biasing force of the spring is applied to the movable base upon the vehicle rear-end collision and when subsequent rearward movement of the movable base establishes engagement of the first and second engaging portions; and
the first and second engaging portions being disengaged to allow the relative rotation between the first link and the second link about the connecting shaft when the load applied to the movable base is smaller than the biasing force of the spring and when the resulting disengagement of the first and second engaging portions is established.

14. The headrest device according to claim 13, further comprising an elongated slide guiding bore provided in the movable base, a connection hole provided in the fixed base, a connecting shaft provided on the first link, and a connecting shaft provided at the second link, the connecting of the first link being slidably positioned in the elongated slide guiding bore, the connecting shaft of the second link being rotatably positioned in the connection hole.

15. The headrest device according to claim 14, wherein the elongated slide guiding bore has a width in a direction transverse to a direction of elongation of the elongated slide guiding bore that is greater than a width of the connecting shaft of the first link.

16. The headrest device according to claim 13, wherein the first engaging portion comprises teeth and the second engaging portion comprises teeth.

* * * * *